(12) United States Patent
Stout, Jr.

(10) Patent No.: US 6,548,760 B1
(45) Date of Patent: Apr. 15, 2003

(54) ONE-PIECE SEAMLESS REDUCER

(75) Inventor: William K. Stout, Jr., Mason, OH (US)

(73) Assignee: Eastern Sheet Metal, Inc., Cincinnati, OH (US)

( * ) Notice: Subject to any disclaimer, the term of this patent is extended or adjusted under 35 U.S.C. 154(b) by 0 days.

(21) Appl. No.: 09/734,345

(22) Filed: Dec. 11, 2000

(51) Int. Cl.[7] .................. F16L 55/00; H02G 15/00
(52) U.S. Cl. ............. 174/65 R; 174/135; 138/44; 138/177; 285/148.23; 285/148.24
(58) Field of Search ............... 174/65 G, 151, 174/152 G, 153 G, 135, 65 R; 16/2.1, 2.2; 248/56; 138/44, 177; 285/148.23, 148.24, 148.25, 148.26

(56) References Cited

U.S. PATENT DOCUMENTS

| | | | | |
|---|---|---|---|---|
| 3,904,814 A | * | 9/1975 | Dawson et al. ............ | 174/84 R |
| 3,990,661 A | * | 11/1976 | De Groef ................... | 248/56 |
| 4,581,265 A | * | 4/1986 | Follette ..................... | 428/36.1 |
| 4,603,806 A | * | 8/1986 | Watanabe et al. ........... | 228/152 |
| 4,747,431 A | * | 5/1988 | LaCount et al. ............ | 138/109 |
| 4,794,956 A | * | 1/1989 | Gordon et al. ............... | 138/39 |
| 4,944,973 A | * | 7/1990 | Follette ..................... | 428/36.1 |
| 4,982,653 A | * | 1/1991 | Gordon et al. ............. | 454/335 |
| 5,361,846 A | * | 11/1994 | Carlin et al. ................ | 166/380 |
| 5,458,438 A | * | 10/1995 | Wyke et al. ............. | 405/184.4 |
| 5,743,301 A | * | 4/1998 | Winship ..................... | 138/109 |
| 5,810,052 A | * | 9/1998 | Kozyuk ..................... | 137/44 |
| 6,024,129 A | * | 2/2000 | Schima ..................... | 138/44 |
| 6,291,043 B1 | * | 9/2001 | Abbott ...................... | 428/36.9 |
| 6,355,318 B1 | * | 3/2002 | Tailor et al. ............... | 428/34.9 |

* cited by examiner

Primary Examiner—Dean A. Reichard
Assistant Examiner—Angel R. Estrada
(74) Attorney, Agent, or Firm—Dinsmore & Shohl LLP

(57) ABSTRACT

A seamless reducer formed from a single continuous sheet of material includes a first section including a first wall, a second section including a second wall, and a tapered section including a tapered wall. The tapered wall is connected to and extends between the second section and the first section in a direction at an angle from about 25° to about 40° with respect to a central axis.

7 Claims, 7 Drawing Sheets

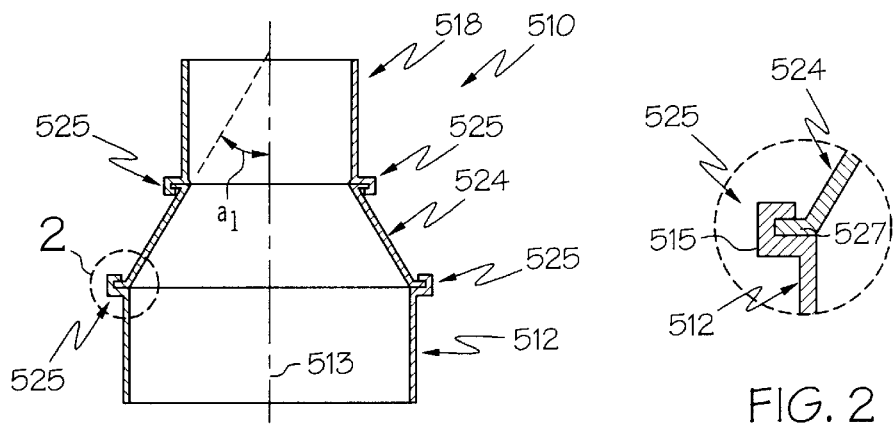
FIG. 1 (PRIOR ART)
FIG. 2 (PRIOR ART)
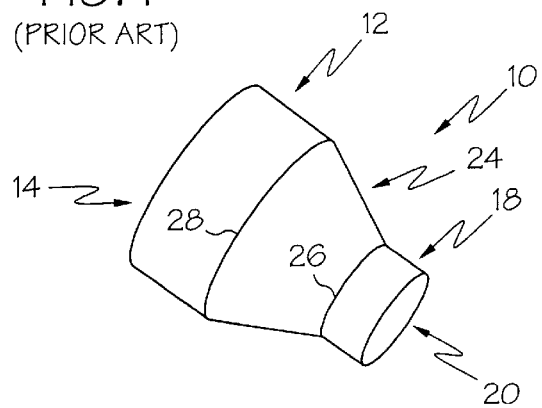
FIG. 3
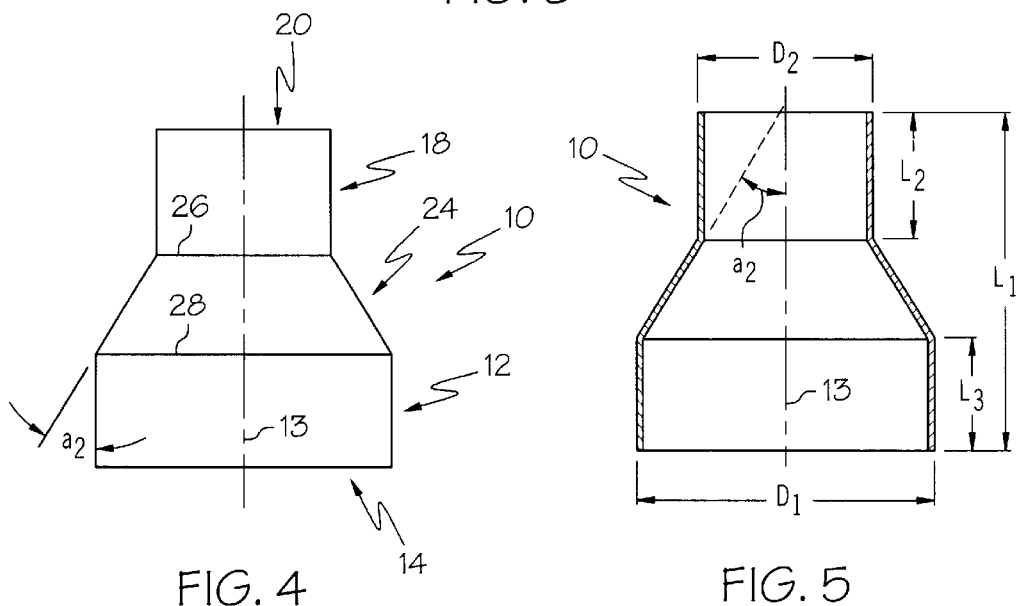
FIG. 4
FIG. 5

ONE-PIECE SEAMLESS REDUCER

TECHNICAL FIELD

This invention relates generally to reducers for connecting conduits of different sizes, and more particularly to one-piece seamless reducers.

BACKGROUND OF THE INVENTION

Reducers are currently known to couple different sized fluid conduits or pipes. As illustrated in FIG. 1, for example, conventional reducers 510 are often formed from a plurality of sections that are mechanically joined together by welding or crimping. For instance, it is known to crimp together a first section 512 to a tapered section 524 with a crimped joint 525. An enlarged crimped joint 525 is illustrated in FIG. 2 wherein a protruding flange 527 extending from the tapered section 524 is coupled to the crimped flange 515 of the first section 512. In a similar manner, crimped joints 525 may further be provided to connect a second section 518 to the tapered section 524. The intermediate sections 524, as shown in FIG. 1, are often tapered wherein the tapered wall of the tapered section extends between the second section 518 and the first section 512 in a direction at angle "$a_1$" with respect to a central axis 513, referred to herein as the axis angle. For instance, the tapered wall may have a frustoconical shape as illustrated in FIG. 1, thereby providing a gradual reduction of cross sectional area from the inside diameter of the first section 512 to the inside diameter of the second section 518. Providing a gradual reduction with the frustoconical intermediate section is known to reduce the turbulence generated in a fluid traveling from the first section 512 to the second section 518 as the fluid velocity increases and/or the fluid is compressed. Similarly, the frustoconical intermediate section is known to reduce the turbulence generated in fluid as the fluid travels from the second section 518 to the first section 512 as the fluid velocity decreases and/or the fluid expands.

As illustrated in FIG. 1, the axis angle "$a_1$" may be selected at any angle depending upon the application and system requirements. For instance, it is known to provide a multi-piece reducer as shown in FIG. 1 with the axis angle "$a_1$" being from about 25° to about 45°.

It is also known to provide a one-piece seamless reducer formed from a single continuous sheet of material wherein the axis angle is about 45° from the central axis. Forming the reducer as a one-piece seamless reducer from a single continuous sheet of material is desirable to simplify the manufacturing process, minimize the cycle time, and thereby minimize the costs of producing the reducers.

However, in order to achieve an axis angle of less than 45° in a reducer, a plurality of separate sections must be mechanically joined together, for instance, as shown in FIGS. 1 and 2. Prior known attempts to fabricate a one-piece seamless reducer from a continuous sheet of material to achieve angles of less than 45° typically resulted in structural failure (i.e., ripping or tearing of the material) when attempting to form the tapered section during the manufacturing process due to high internal stresses and/or turbulence in the material as it is fabricated.

SUMMARY OF THE INVENTION

Accordingly, it is an object of the present invention to obviate problems and shortcomings of conventional reducers. More particularly, it is an object of the present invention to provide a one-piece seamless reducer having a tapered wall extending from the second section to the first section at an angle from about 25° to about 40° with respect to the central axis.

To achieve the foregoing and other objects in accordance with the present invention, a one-piece seamless reducer is provided that is formed from a single continuous sheet of material. The reducer comprises a first section including a first wall symmetrically surrounding and substantially parallel to a central axis. The first wall defines a first outer dimension. The reducer further comprises a second section including a second wall symmetrically surrounding and substantially parallel to the central axis. The second wall defines a second outer dimension, wherein the first outer dimension is larger than the second outer dimension. A tapered section is also provided that includes a tapered wall symmetrically surrounding the central axis. The tapered wall is connected to and extends between the second section and the first section in a direction at an axis angle from about 25° to about 40° with respect to the central axis. The one-piece seamless reducer has a desirable axis angle and is free of crimped seams. Forming the reducer as a one-piece seamless reducer from a single continuous sheet of material is desirable to simplify the manufacturing process, minimize the cycle time, and thereby minimize the costs of producing the reducers.

Still other objects and advantages of the present invention will become apparent to those skilled in the art from the following description wherein there are shown and described alternative exemplary embodiments of this invention. As will be realized, the invention is capable of other different, obvious aspects and embodiments, all without departing from the invention. Accordingly, the drawings and descriptions should be regarded as illustrative in nature and not as restrictive.

BRIEF DESCRIPTION OF THE DRAWINGS

While the specification concludes with claims particularly pointing out and distinctly claiming the present invention, it is believed the same will be better understood from the following description taken in conjunction with the accompanying drawings in which:

FIG. 1 is a sectional view of a conventional multi-piece reducer having crimped joint connections;

FIG. 2 is an enlarged view of a conventional crimped joint connection of the multi-piece reducer of FIG. 1;

FIG. 3 is a perspective view of the reducer in accordance with the present invention;

FIG. 4 is a side elevational view of the reducer of FIG. 3;

FIG. 5 is a cross sectional view of the reducer of FIG. 3;

DETAILED DESCRIPTION

Figure 6:
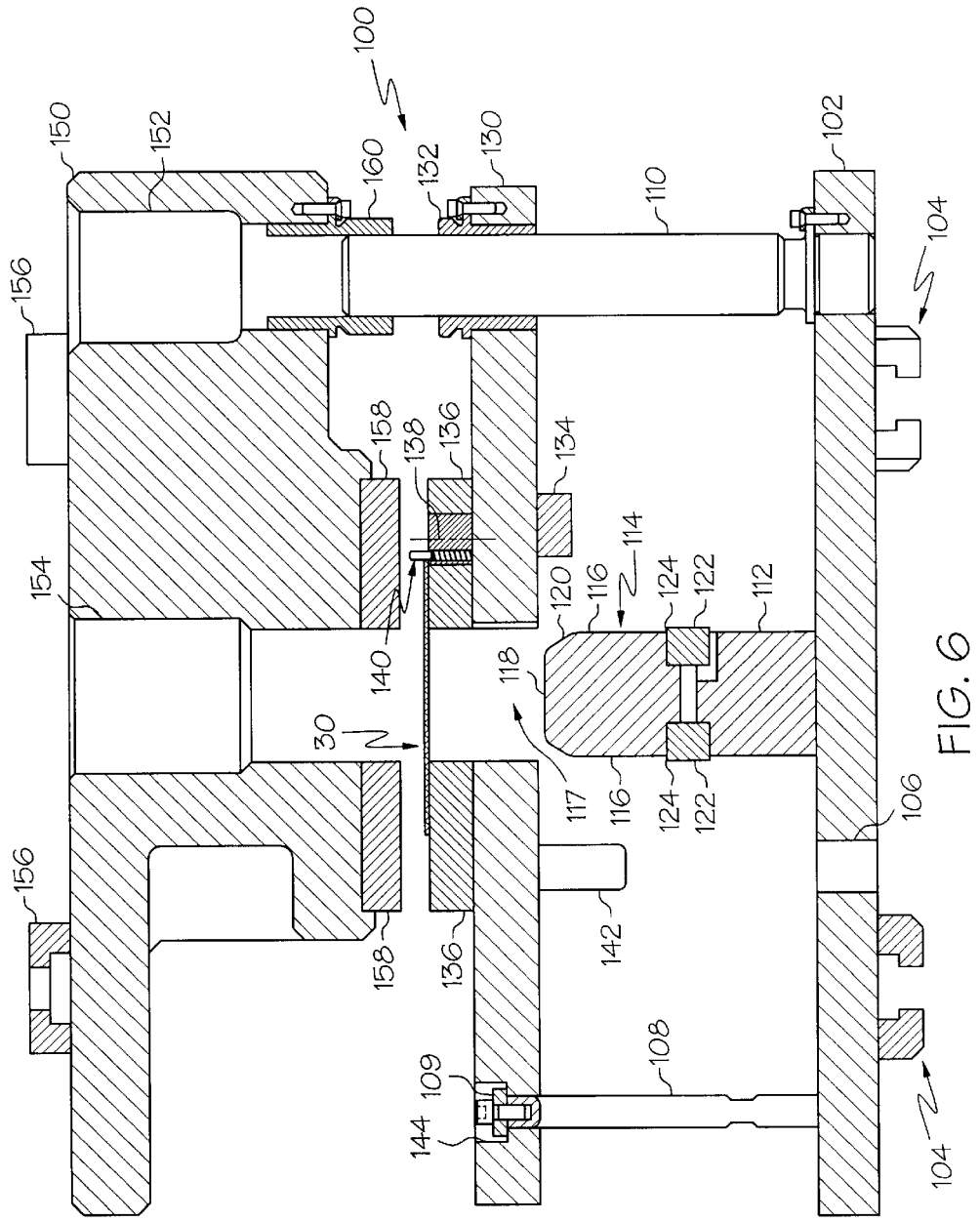
FIG. 6 illustrates a first stage apparatus for creating a closed cylinder wherein a flat blank is inserted.

Turning now to the drawing figures, wherein the same element numbers indicate the same or corresponding structures throughout the views, FIG. 3 illustrates a perspective view of a reducer 10 in accordance with the present invention. The reducer 10 is formed as a one-piece seamless reducer from a single continuous sheet of material. The reducer 10 has three sections. A first section 12 including a first open end 14 is connected to a tapered section 24 at a first seamless bend 28. Similarly, a second section 18 including a second open end 20 is connected to the tapered section 24 at a second seamless bend 26.

As shown in FIGS. 4 and 5, the first section 12 includes an first wall symmetrically surrounding and substantially parallel to a central axis 13. The first Wall defines a first wall outer dimension $D_1$ as illustrated in FIG. 5. For instance, in one embodiment, the first wall is formed as a cylinder wherein the outer dimension is the outer diameter $D_1$ of the first section 12. The first wall may extend for a length of $L_3$. The second section 18 includes a second wall symmetrically surrounding and substantially parallel to the axis 13. The second wall defines a second outer dimension $D_2$ wherein the first outer dimension $D_1$ is larger than the second outer dimension $D_2$. In one embodiment, the second wall is formed as a cylinder wherein the second outer dimension is a second outer diameter $D_2$ of the second section 18. The second wall may extend for a length of $L_2$. A tapered section 24 is further provided including a tapered wall symmetrically surrounding the central axis 13. A tapered wall is connected to and extends between the second section 18 and the first section 12 in a direction at an angle "$a_2$" with respect to the central axis 13 as illustrated in FIGS. 4 and 5, hereinafter the axis angle. The axis angle in accordance with the present invention may be from about 25° to about 40°. In other examples, the axis angle may be from about 25° to about 35°. In still another example, the axis angle is about 30°. Accordingly, a one-piece seamless reducer 10 is formed from a single continuous sheet of material and may be formed with an overall length $L_1$.

The particular dimensions of the reducer 10 may be selected to accommodate the particular application of use. For instance, the overall length $L_1$ may be between from about 5 to about 24 inches. In another embodiment, $L_1$ may be between from about 9 to about 12 inches. The first outer dimension $D_1$ may be, for example, from about 10 to about 12 inches in diameter. In one particular embodiment, the first outer dimension $D_1$ may be either about 9⅞ or about 11⅞ inches. The second outer dimension $D_2$ may be between from about 5 to about 10 inches. For example, the second outer dimension $D_2$ may either be about 5⅞, about 7⅞, or about 9⅞ inches. One skilled in the art will recognize that these specific dimensions are exemplary, and that reducers of other dimensions are within the scope of the invention. The material used to form the reducer may be a flat blank 30 having a thickness of approximately 1/32 inch, although a blank of another thickness may also be used. The flat blank 30 may comprise steel (e.g., galvanized steel, coated galvanized steel, stainless steel), aluminum or the like.

Figure 7:
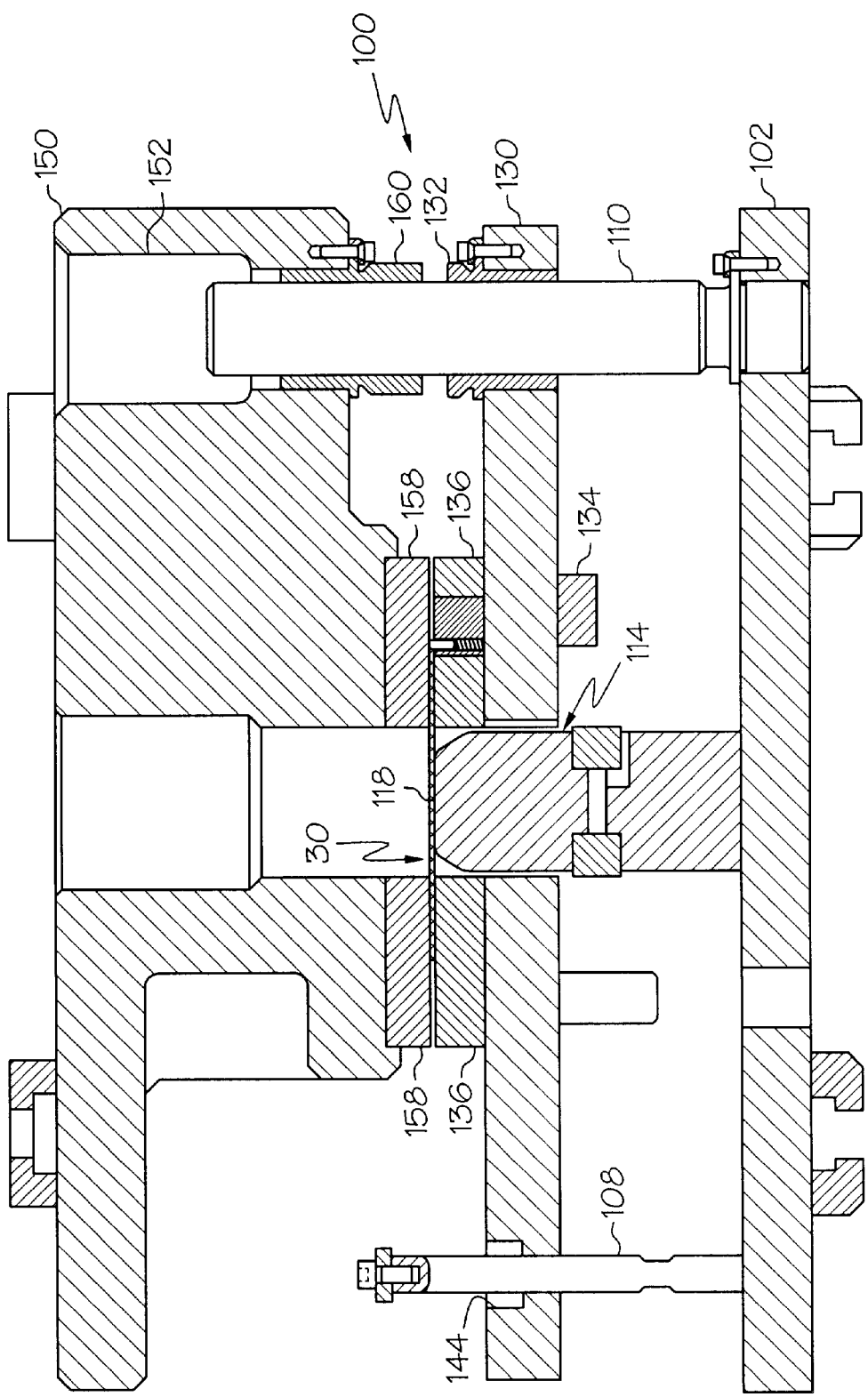
FIG. 7 illustrates the first stage apparatus of FIG. 6 just prior to the drawing the closed cylinder.
Figure 8:
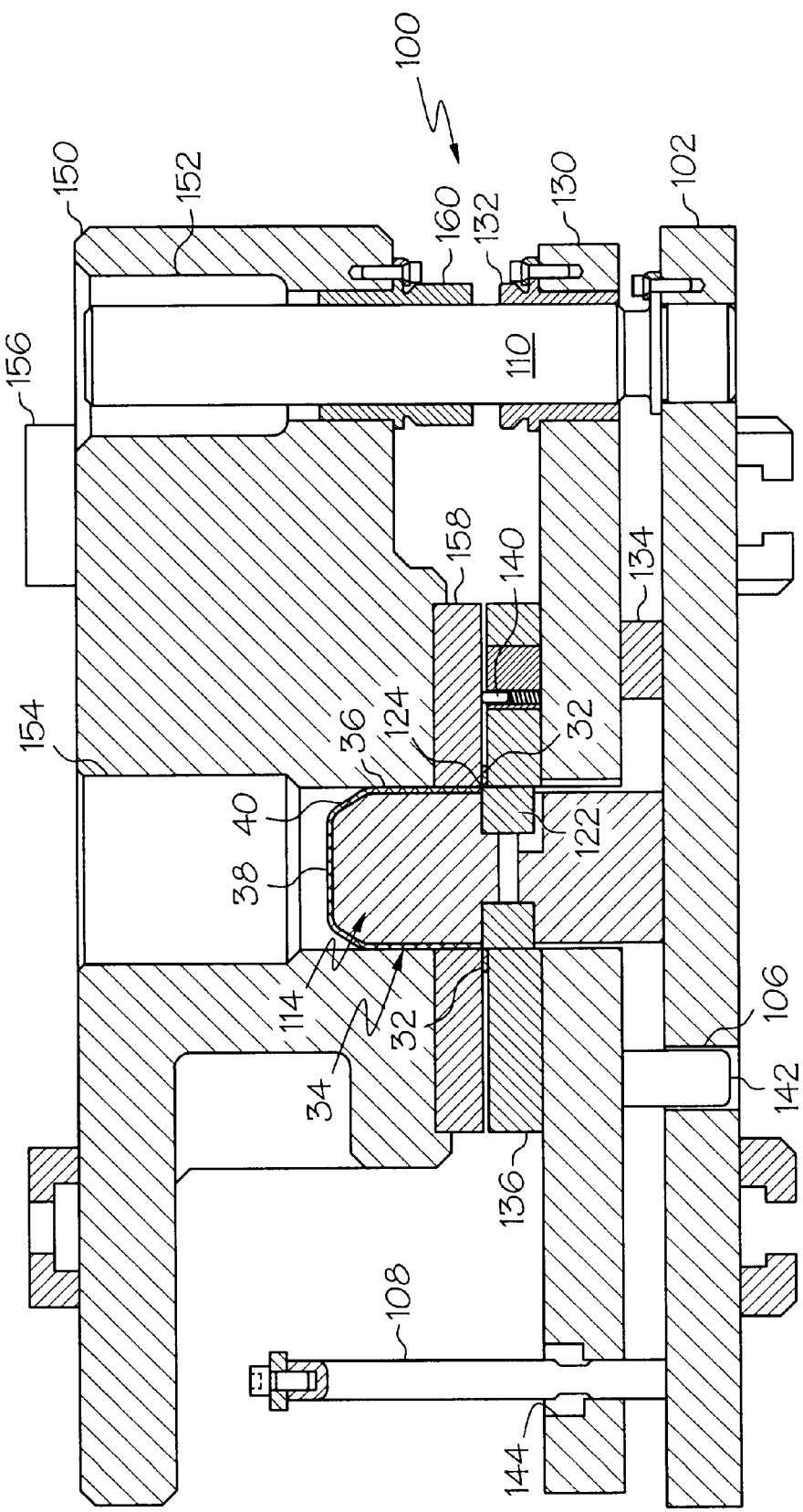
FIG. 8 illustrates the first stage apparatus of FIG. 6 after the flat blank has been drawn into a closed cylinder.

FIGS. 6–11 disclose one process for forming a reducer according to the present invention. FIGS. 6 through 8 depict a first stage apparatus 100 for forming a closed cylinder 34 as illustrated in FIG. 8. Turning to FIG. 6, the first stage apparatus 100 includes a bottom casting 102. Tool clamp units 104 are provided on the bottom casting 102 to mount the bottom casting 102 to a support surface or other machine. The bottom casting 102 is provided with a guide pillar 110 mounted thereon to guide the movement of a die cushion plate 130 and a top casting 150 as will further be described in more detail below. The bottom casting 102 is further provided with a security rod 108 with a fastener, such as a screw, mounting a washer 109 to one end of the security rod 108. The combination of the security rod 108 and washer 109 prevents separation of the die cushion plate 130 from the bottom casting 102 as will be further described below. The bottom casting 102 also includes a spacer 112 for supporting and locating a cutting punch 122 and a draw punch 114. The cutting punch 122 has a cutting or pinching edge 124 for shearing a portion of the flat blank 30 when forming the closed cylinder 34 as will be further described below. The draw punch 114 includes at least one sidewall 116, an end wall 118, and a tapered end portion 120 for drawing the flat blank 30 into the closed cylinder 34.

The die cushion plate 130 is capable of vertical movement relative to the bottom casting 102 and is provided with a guide bushing 132 mounted with fasteners, for instance, to the die cushion plate 130. The guide bushing 132 reduces friction between the die cushion plate 130 and the guide pillar 110. The die cushion plate 130 further defines a stop channel 144 to provide a guide path for the die cushion plate 130 along the security rod 108. Once a maximum vertical distance of the die cushion plate 130 is obtained, the washer 109 interferes with the stop channel 144 to prevent further vertical movement of the die cushion plate 130 relative to the bottom casting 102. The die cushion plate 130 is further provided with a spacer 142 that extends downwardly from the bottom surface of the die cushion plate 130. The spacer 142 is designed to enter a channel 106 defined by the bottom casting 102 to help laterally align the die cushion plate 130 relative to the bottom casting 102.

The die cushion plate 130 is further provided with a spacer 134 that maintains a minimum distance between the die cushion plate 130 and the bottom casting 102. The die cushion plate 130 is further provided with a channel 117 designed to receive the draw punch 114 and the cutting punch 122. An upper die cushion plate 136 is mounted on the die cushion plate 130 wherein the upper die cushion plate 136 is designed to receive the flat blank 30 as illustrated in FIG. 6 one or more rotating positioning elements 138 are mounted in the upper die cushion plate 136. The rotating positioning element 138 are each provided with one or more spring biased pins 140 designed to act in cooperation with the rotating positioning elements 138 to receive different-sized flat blanks 30.

The top casting 150 is provided with a guide bushing 160 to reduce the friction between the guide pillar 110 and the top casting 150. The top casting 150 is formed with a guide pillar channel 152 designed to receive the guide pillar 110 during operation of the first stage apparatus 100. Similarly, a draw punch channel 154 is formed in the top casting 150 and is designed to receive the draw punch 114. A draw die 158 is mounted on the top casting 150 and is designed to trap the flat blank 30 as will be described more fully below. A tool clamp unit 156 is provided on the top casting 150 in order to attach the top casting 150 to a support or other machine.

In use, a flat blank 30 is inserted between the upper die cushion plate 136 and the draw die 158 as illustrated in FIG. 6. For instance, the flat blank 30 could be positioned on the upper die cushion plate 136. Each of the one or more positioning elements could then be rotated (i.e., prior to or after placement of the blank 30 on the plate 136) such that the pins 140 may abut against the periphery of the blank 30, thereby locating the blank 30 relative to the plate 136. The top casting 150 is then moved vertically downward until the draw die 158 rests against and thereby traps the flat blank 30 between the draw die 158 and the upper die cushion plate 136 as illustrated in FIG. 7.

Once contact is made between the draw die 158 and the top surface of the flat blank 30, both the top casting 150 and the die cushion plate 130 with the flat blank 30 therebetween move together vertically downward until a portion of the bottom surface of the flat blank 30 rests against the end wall 118 of the draw punch 114 as illustrated in FIG. 7.

As illustrated in FIG. 8, the top casting 150, the die cushion plate 130, and the flat blank 30 are further moved downward relative to the bottom casting 102 whereby the draw punch 114 draws the flat blank 30 into the closed cylinder 34. The end wall 118 of the draw punch 114 forms an end wall 38 of the closed cylinder 34. The side walls 116 of the draw punch 114 form side walls 36 of the closed cylinder 34. Furthermore, a tapered end portion 40 of the closed cylinder 34 is formed by the tapered end portion 120 of the draw punch 114. As illustrated in FIG. 8, a scrap material ring 32 may be cut or pinched off of the closed cylinder 34 during the completion of the process. As shown in FIG. 8, the cutting edge 124 of the cutting punch 122 pinches or cuts the scrap ring 32 from the closed cylinder 34 as the cutting punch 122 passes by the draw die 158. Downward movement continues until the spacer 134 abuts the upper surface of the bottom casting 102. As illustrated in FIG. 8, the spacer 142 is received within the channel 106 to assist in laterally orienting the die cushion plate 130 relative to the bottom casting 102.

Figure 9:
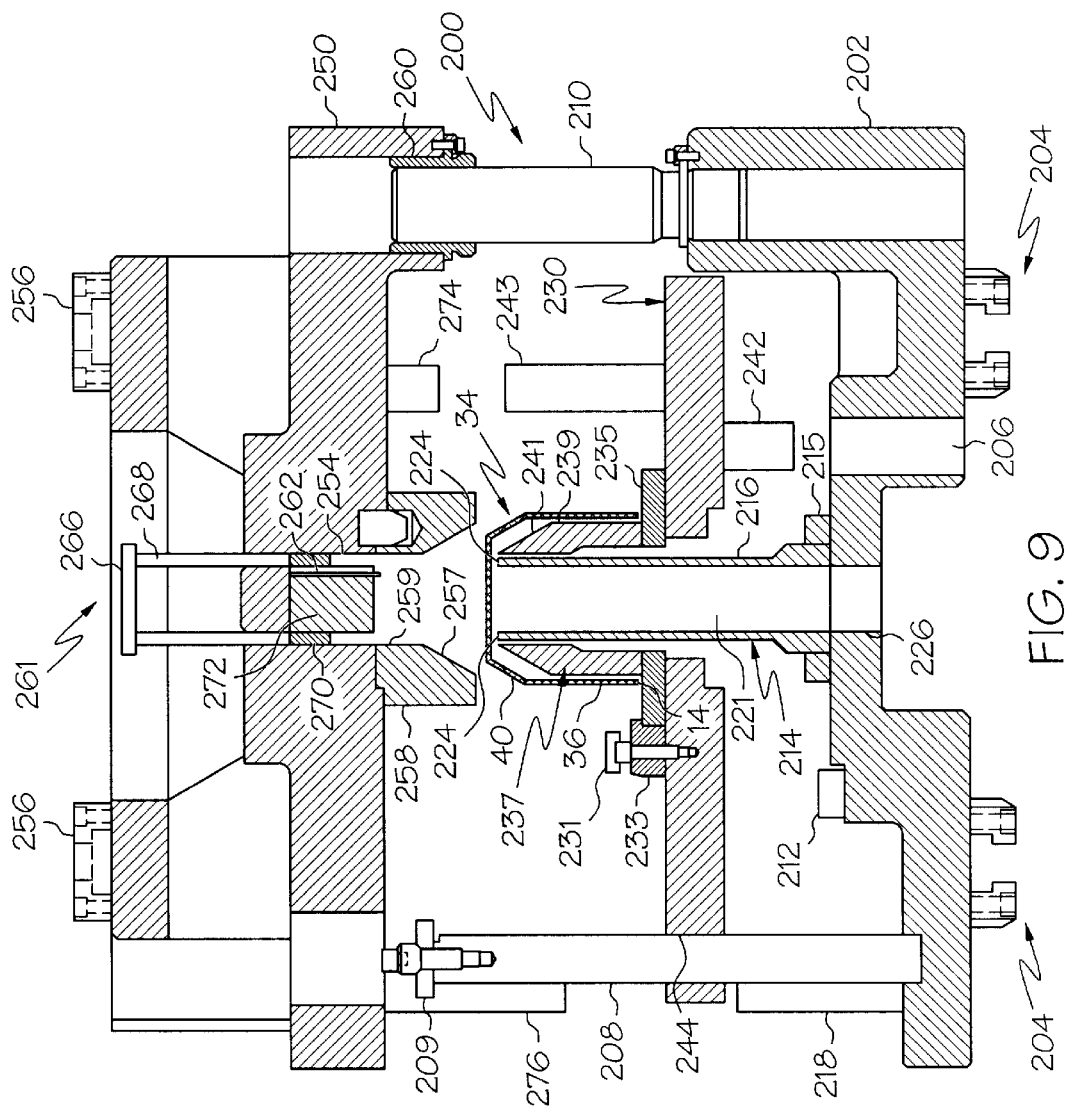
FIG. 9 illustrates a second stage apparatus for creating the one-piece seamless reducer of FIGS. 3–5 from the closed cylinder created by the first stage apparatus as illustrated in FIGS. 6–8, wherein the closed cylinder is positioned over the form of a die cushion plate.
Figure 10:
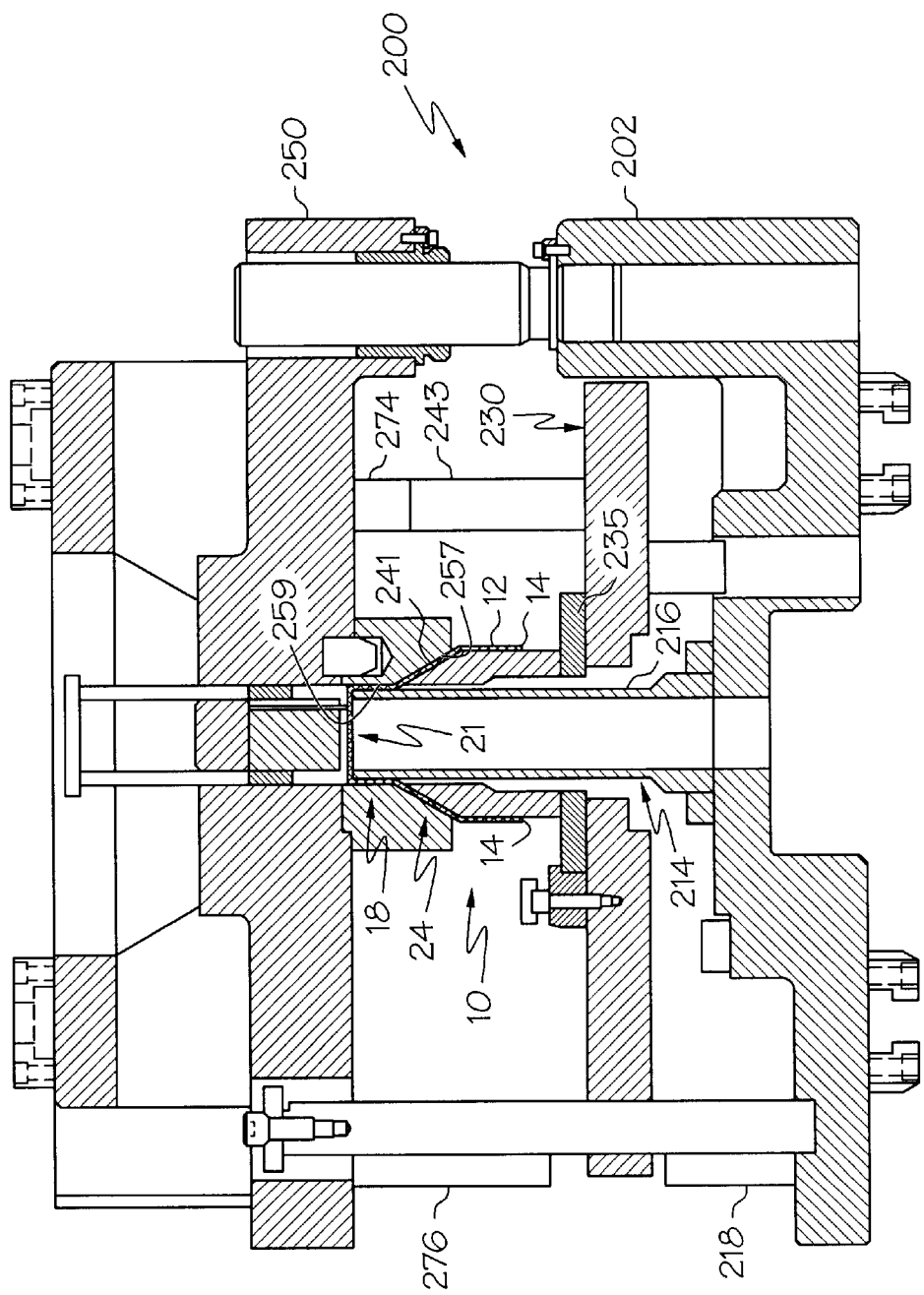
FIG. 10 illustrates the second stage apparatus of FIG. 9 wherein the closed cylinder is formed and drawn into a reducer having a closed end cap.
Figure 11:
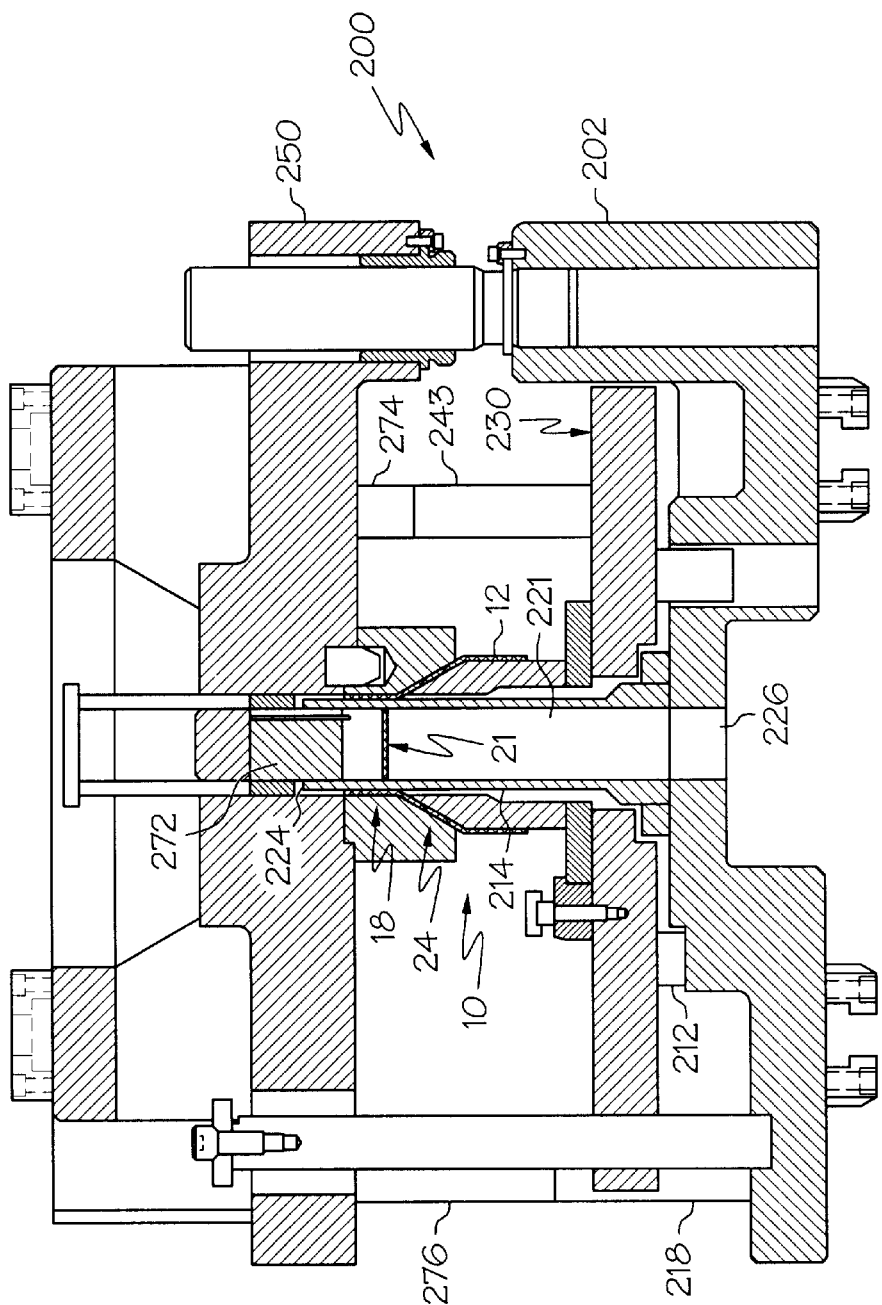
FIG. 11 illustrates the second stage apparatus of FIG. 9 wherein the end cap is punched out to form the one-piece seamless reducer of FIGS. 3–5.

FIGS. 9–11 illustrate a second stage apparatus 200 for forming the one-piece seamless reducer 10 illustrated in FIGS. 3–5 from the closed cylinder 34 created by the first stage apparatus as illustrated in FIGS. 6–8. The second stage apparatus 200 includes a bottom casting 202 provided with a guide pillar 210 mounted to the bottom casting 202 with a mechanical fastener. The bottom casting 202 is further provided with dual clamp units 204 adapted to mount the bottom casting 202 to a support surface or other machine. The bottom casting 202 includes a first spacer 212 to provide a minimum vertical distance between a die cushion plate 230 and the bottom casting 202 and a second spacer 218 to provide a minimum vertical distance between a top casting 250 and the bottom casting 202. A draw punch 214 is mounted to the bottom casting 202 with a draw punch holder 215 such that a channel 221 formed by the draw punch 214 is aligned with a channel 226 defined by the bottom casting 202.

The die cushion plate 230 is mounted for vertical movement relative to the bottom casting 202 wherein a stop channel 244 receives the security rod 208 such that the die cushion plate 230 slides relative to the security rod 208. The security rod 208 may be provided with a washer 209 mounted with a fastener such as a screw to the security rod 208. The combination of the security rod 208 and washer 209 act as a stop to limit the vertical movement of the die cushion plate 230 relative to the bottom casting 202.

An adapter 235 is used to mount a form 237 to the die cushion plate 230. The adapter 235 in turn is mounted to the die cushion plate 230 with an adapter holder 233 and a tightening and loosening handle 231. The form 237 has formed side walls 239 adapted to support the side wall 36 of the closed cylinder 34. In addition, the form 237 includes a tapered side wall 241 adapted to create the tapered section 24 of the reducer 10. The die cushion plate 230 is provided with a spacer 242 adapted to be received in a channel 206 defined by the bottom casting 202 to align and prevent undesirable lateral movement of the die cushion plate 230 relative to the bottom casting 202. The die cushion plate 230 is further provided with a spacer 243 adapted to establish a minimum separation distance between the die cushion plate 230 and the top casting 250.

The top casting 250 is provided with tool clamp units 256 adapted to mount the top casting 250 to a machine or other support device. The top casting 250 is provided with a guide bushing 260 adapted to minimize the friction between the top casting 250 and the guide pillar 210 as the top casting 250 is vertically moved relative to the bottom casting 202. A draw die 258 is mounted on the top casting 250. The draw die 258 includes a tapered side wall 257. The tapered side wall 257, together with the tapered side wall 241, are adapted to form the tapered section 24 of the reducer 10 as more fully described below. The draw die 258 is further provided with side walls 259 that are adapted to form the second section 18 of the reducer 10 as more fully described below. The top casting 250 is provided with an ejector assembly 261 adapted to discharge the reducer 10 from the second stage apparatus 200. The ejector assembly 261 includes an ejector plate 266 mounted on an ejector spacer 268. The ejector plate 266 is adapted to force an ejector ring 270 downward through the draw punch channel 254 in order to downwardly eject any reducer 10 that might be engaging the second stage apparatus 200. An ejector pin 262 is also provided to assist in ejecting the reducer 10.

In use, the closed cylinder 34 formed by the first stage apparatus 100 of FIGS. 6–8 is inserted over the form 237 as shown in FIG. 9. The top casting 250 is then moved downward until the tapered side wall 257 of the draw die 258 engages the tapered end portion 40 of the closed cylinder 34. As the top casting 250 continues to move downwardly relative to the bottom casting 202, the tapered wall 257 together with the tapered side wall 241 form the tapered section 24 as illustrated in FIG. 10.

Further downward movement continues until the spacer 274 extending from the top casting 250 abuts the spacer 243 extending from the die cushion plate 230. Thereafter, the top casting 250 travels downwardly together with the die cushion plate 230 as the second section 18 is formed by the side wall 216 of the draw punch 214. As shown in FIG. 10, the draw punch 214 draws the closed cylinder 34 upwardly wherein the first end 14 begins to move upwardly off the adapter 235 as shown in FIG. 10.

FIG. 11 illustrates the punch 272 of the top casting 250 with the cutting edge 224 of the draw punch 214 punching out a circular cap 21 from the top of the reducer 10. The circular cap 21 falls through the channel 221 of the draw punch 214 and further falls through the channel 226 defined in the bottom casting 202 until the endcap 21 exits from the second stage apparatus 200. Downward movement of the die cushion plate 230 relative to the bottom casting 202 is limited by the spacer 212. Downward movement of the top casting 250 relative to the bottom casting 202 is limited as the spacer 276 extending from the top casting 250 abuts the spacer 218 extending from the bottom casting 202.

The reducer 10 is then removed from the second stage apparatus to 200 by vertically separating the top casting 250 and the die cushion plate 230 relative to the bottom casting 202. If the reducer 10 is still attached to the top casing 250, the ejector plate 266 is then pushed downwardly such that the ejector ring 270 forces the section 18 from the draw punch channel 254.

Accordingly, a reducer is formed from one continuous sheet of material in order to simplify the manufacturing process, minimize cycle time, and thereby reduce costs of producing reducers. Moreover, a 30° angle can be produced that reduces turbulence generated during fluid flow.

The foregoing description of the various embodiments of the invention has been presented for the purposes of illustration and description. It is not intended to be exhaustive or to limit the invention to the precise form disclosed. Many alternatives, modifications and variations will be apparent to those skilled in the art. Accordingly, this invention is intended to embrace all alternatives, modifications and variations that have been discussed herein, and others that fall within the spirit and broad scope of the claims.

What is claimed is:

1. A one-piece seamless reducer comprising a single continuous sheet of material including:
    a) a first section including a first wall symmetrically surrounding and substantially parallel to a central axis, the first wall defining an outer diameter and an inner diameter,
    b) a second section including a second wall symmetrically surrounding and substantially parallel to the central axis, the second wall defining an outer diameter and an inner diameter, wherein the outer diameter of the first wall is greater than the outer diameter of the second wall and further wherein the inner diameter of the first wall is greater than the inner diameter of the second wall, and
    c) a tapered section including a tapered wall symmetrically surrounding the central axis, the tapered wall connected to and extending between the second section and the first section in a direction at an axis angle from about 25° to about 40° with respect to the central axis, wherein the first section, the second section and the tapered section define a one-piece seamless reducer.

2. The reducer of claim 1, wherein the first wall and the second wall are cylindrical and wherein the tapered wall is frustoconical.

3. The reducer of claim 1, wherein the axis angle is from about 25° to about 35°.

4. The reducer of claim 3, wherein the axis angle is about 30°.

5. The reducer of claim 1, wherein the outer diameter of the first wall is from about 10 inches to about 12 inches and wherein the outer diameter of the second wall is from about 5 inches to about 10 inches.

6. The reducer of claim 1, wherein the reducer is fabricated from steel.

7. The reducer of claim 1, wherein the reducer is fabricated from aluminum.

* * * * *